US010464384B2

(12) United States Patent
Ishikawa et al.

(10) Patent No.: US 10,464,384 B2
(45) Date of Patent: Nov. 5, 2019

(54) IN-WHEEL MOTOR DRIVE DEVICE

(71) Applicant: NTN CORPORATION, Osaka (JP)

(72) Inventors: Takanori Ishikawa, Shizuoka (JP); Shiro Tamura, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/090,600

(22) PCT Filed: Mar. 9, 2017

(86) PCT No.: PCT/JP2017/009519
§ 371 (c)(1),
(2) Date: Oct. 2, 2018

(87) PCT Pub. No.: WO2017/175536
PCT Pub. Date: Oct. 12, 2017

(65) Prior Publication Data
US 2019/0111747 A1    Apr. 18, 2019

(30) Foreign Application Priority Data
Apr. 6, 2016 (JP) .................... 2016-076351

(51) Int. Cl.
*B60K 7/00*        (2006.01)
*B60G 3/28*        (2006.01)
(Continued)

(52) U.S. Cl.
CPC ............... *B60G 3/28* (2013.01); *B60G 11/16* (2013.01); *B60K 7/00* (2013.01); *B60K 7/0007* (2013.01);
(Continued)

(58) Field of Classification Search
CPC .... B60R 16/0207; B60G 7/001; B60G 13/00; B60G 3/28; B60G 11/16; B60K 1/04;
(Continued)

(56) References Cited

U.S. PATENT DOCUMENTS 5,087,229 A     2/1992  Hewko et al.
7,653,987 B2 *  2/2010  Tokuda ............... B60K 7/0007
                                            140/92.1
(Continued)

FOREIGN PATENT DOCUMENTS

JP      2005-132174     5/2005
JP      2005-271909     10/2005
(Continued)

*Primary Examiner* — Bryan A Evans
(74) *Attorney, Agent, or Firm* — Clark & Brody

(57) ABSTRACT

An in-wheel motor drive device includes a motor unit having a plurality of power line connecting portions (91, 91, 91), and a plurality of bendable power lines (93, 93, 93) whose one ends connect with the power line connecting portions and whose other ends extend to a vehicle body outside a casing and supplies electric power to the motor unit from the vehicle body, and which in-wheel motor drive device can be steered about a steering axis (K) intersecting with a spring sheet (79c) of a shock absorber. Furthermore, viewing from the steering axial direction, the plurality of power line connecting portions is disposed overlapping a spring sheet.

5 Claims, 13 Drawing Sheets

(51) Int. Cl.
*B60G 11/16* (2006.01)
*H02K 5/22* (2006.01)
*B60K 17/04* (2006.01)

(52) U.S. Cl.
CPC .............. *B60K 17/046* (2013.01); *H02K 5/22* (2013.01); *B60K 2007/0038* (2013.01); *B60K 2007/0092* (2013.01); *B60L 2220/44* (2013.01)

(58) Field of Classification Search
CPC ...... B60K 7/00; B60K 7/0007; B60K 17/043; B60K 17/046; B60K 2007/0038; B60K 2007/0061; B60K 2007/0092; B62D 9/00; H02K 5/22; B60L 2220/44
See application file for complete search history.

(56) References Cited

U.S. PATENT DOCUMENTS

| | | | |
|---|---|---|---|
| 9,553,414 B2* | 1/2017 | Matayoshi | H01R 13/73 |
| 10,059,162 B2* | 8/2018 | Matayoshi | B60K 7/00 |
| 2007/0234559 A1* | 10/2007 | Tokuda | B60K 7/0007 29/755 |
| 2015/0061440 A1 | 3/2015 | Catalan | |
| 2015/0158381 A1 | 6/2015 | Shin | |
| 2016/0149357 A1* | 5/2016 | Matayoshi | H01R 13/73 439/34 |
| 2017/0190229 A1* | 7/2017 | Matayoshi | B60K 7/00 |
| 2017/0369007 A1* | 12/2017 | Tamura | B60K 7/00 |
| 2018/0215271 A1* | 8/2018 | Nakayama | B60K 1/02 |

FOREIGN PATENT DOCUMENTS

| | | |
|---|---|---|
| JP | 2006-240430 | 9/2006 |
| JP | 2006-264474 | 10/2006 |
| JP | 2008-001241 | 1/2008 |
| JP | 2008-308033 | 12/2008 |
| JP | 4511976 | 7/2010 |
| JP | 4628136 | 2/2011 |
| JP | 2013-159188 | 8/2013 |
| JP | 2015-013528 | 1/2015 |
| JP | 2015-131629 | 7/2015 |

\* cited by examiner

Outer side in vehicle width direction
←

Upper side ↑

Outer side in vehicle width direction →

Outer side in vehicle width direction ← | Front side of vehicle

IN-WHEEL MOTOR DRIVE DEVICE

TECHNICAL FIELD

The present invention relates to a power line extending from an in-wheel motor drive device to a vehicle body for supplying electric power from the vehicle body to the in-wheel motor drive device.

BACKGROUND ART

There is a conventionally well-known technology that provides an in-wheel motor inside wheels of an electric vehicle and that drives the wheels with the in-wheel motor. With such an electric vehicle, there is no need to install an engine or a motor in the vehicle body, and is advantageous in the point of being able to increase the internal space of the vehicle body, such as its room space and luggage space. The vehicle body of the electric vehicle is connected with an in-wheel motor via a suspension device. The vehicle body is also installed with a controller unit of the in-wheel motor, a battery, and an inverter. The in-wheel motor connected to a lower part of the spring in the suspension device (wheel side) is then connected to an inverter installed at an upper part of the spring in the suspension device (vehicle body side) with a power line. Conventionally, for example, power lines such as those described in Japanese Patent No. 4511976 (Patent Document 1) and Japanese Patent No. 4628136 (Patent Document 2) are known as power lines that supply electric power from the inverter to the in-wheel motor.

Due to the function of the suspension device, the in-wheel motor changes its position with respect to the vehicle body in vertical directions, or steers in the left-right directions. Therefore, it is necessary to appropriately support the middle parts of the power line so that no unnatural bending occurs to the power line. In the power line wiring arrangement described in the Patent Document, the middle part of the power line is attached to an end plane of the in-wheel motor by a clamp member. Moreover, the surface of the in-wheel motor described in the Patent Document has a plurality of fins vertically arranged thereon. Moreover, in the power line wiring arrangement described in the Patent Document, a terminal box is provided on an outer peripheral surface of a tubular wall among a tubular-shaped in-wheel motor, and ends of three power lines are connected to this terminal box.

CITATION LIST

Patent Literatures

[Patent Document 1] Japanese Patent No. 4511976
[Patent Document 2] Japanese Patent No. 4628136

SUMMARY OF INVENTION

Technical Problem

However, the present inventors found that there are further points for improvement in the above conventional wiring arrangement. Namely, since a clamp member is attached to the surface of the in-wheel motor, a fin cannot be provided on those attached parts. Therefore, a sufficient number of cooling fins could not be provided to the in-wheel motor. Furthermore, the wiring for the power lines requires a number of processes, in order to hold the middle parts of the power line with the clamp member at the predetermined parts.

Moreover, in conventional arrangements, the terminal box of the in-wheel motor is disposed on a front side or rear side of a tubular wall at a front-rear directional position of the vehicle, and thus becomes away from a steering axis of the wheels. Therefore, each power line largely bends when the wheels are steered. Although the power lines are thick and difficult to bend, they are bent and stretched or is bent repetitively in the left or right direction at a same part, repetitively alternating mountain fold and valley fold, every time the in-wheel motor is steered from a straight direction to a left or right direction. Therefore, there is a possibility that bending fatigue accumulates and thus causing deterioration, as the power line is repetitively bent and stretched for a long time at the same part.

Moreover, in the conventional arrangement, three power lines are connected to the terminal box at different positions, when viewing the terminal box from above. Namely, the connecting parts of the power lines with the terminal box is provided away from each other in a horizontal direction; this causes a difference in bending degrees and displacement of the power lines when the in-wheel motor is steered, and the power lines will be largely bent and stretched at certain connected parts. This would cause a certain power line among the three power lines to receive a large bending and stretching load at that connected part, thereby causing fatigue or deterioration. Alternatively, due to the difference in displacement between power lines, the power lines themselves may come into contact and may wear or become damaged.

In view of the above circumstances, an object of the present invention is to provide a technique to reduce the number of processes required in wiring the power lines without providing a clamp member on a surface of the in-wheel motor. Moreover, in relation to the in-wheel motor drive device of a steering wheel, another object is to provide a technique that would make it difficult for a power line connecting portion to bend and stretch at the time of steering. Moreover, another object is to provide a technique to avoid excess bending and stretching and displacement of a certain power line compared to the remaining power lines.

Solution to Problem

In order to achieve these objects, an in-wheel motor drive device according to the present invention includes: a wheel hub coupled to a wheel; a motor unit having a motor rotating shaft adapted to drive the wheel hub, a casing serving as a contour, and a plurality of power line connecting portions provided on the casing; and a plurality of bendable power lines whose one ends connect to the power line connecting portion and whose other ends extend to a vehicle body outside the casing, to supply electric power from the vehicle body to the motor unit, wherein the in-wheel motor drive device is connected to a lower end of a strut extending in a vertical direction, and is steerable about a steering axis extending along the strut. Furthermore, the plurality of power line connecting portions is disposed overlapping a spring sheet of a shock absorber provided in the strut when viewed in a steering axial direction.

According to the present invention, the power line connecting portions are disposed partially or completely overlapping the spring sheet, when viewing the power line connecting portion in the steering axis direction. The steering axis extending along the strut intersects with the spring sheet of the shock absorber attached to the strut, and thus each power line connecting portion comes close to the steering axis. As the distance from the steering axis of the wheel to the power line connecting portion shortens, the varying amount in the distance between both ends of the power line decreases at the time of steering the wheel. This reduces a vertical amplitude at the lowest point of the power lines, thereby allowing for reducing the bending and stretching load on the power lines at the power line connecting portion.

Moreover, according to the present invention, when a distance between the power line connecting portion of 1 and the steering axis is compared to a distance between another power line connecting portion and the steering axis, the difference between the two becomes extremely small. As a result, it is possible to reduce the load of the bending and stretching received by the power line at the power line connecting portion at the time of steering the wheel, as compared to the conventional in-wheel motor.

Moreover, according to the present invention, when the distances from the steering wheel of the wheel to each power line connecting portions are the same, relative displacement between the power lines at the time of repetitively steering decreases, which thus allows for reducing the wearing and damage between power lines caused by the power lines coming into contact with each other.

Moreover, according to the present invention, there is no need to increase the number of clamp members separately in order to avoid the inconvenience that the above certain power lines are excessively bent and stretched and that the power lines contact each other, and can reduce the number of processings for the wiring.

As a preferred embodiment of the present invention, at least two power line connecting portions are disposed overlapping each other when viewed from the steering axial direction. According to such an embodiment, viewing from the steering axis direction, the plurality of power line connecting portions are disposed to be partially or completely overlapping each other; this further reduces the relative displacement between the power lines, and can further reduce the wearing and damage caused by the power lines coming into contact with each other. As another embodiment, viewing from the steering axial direction, the plurality of power line connecting portions are disposed away from each other.

As one embodiment of the present invention, the spring sheet includes an upper spring sheet and a lower spring sheet that are disposed with a space provided therebetween vertically, and the plurality of power line connecting portions are disposed overlapping the lower spring sheet when viewed in the steering axial direction. The plurality of power line connecting portions as another embodiment may be disposed overlapping the upper spring sheet.

As a preferred embodiment of the present invention, the plurality of power line connecting portions is disposed shifted in a vehicle front-rear direction from the steering axis, and one end of the power line extending from the power line connecting portion extends in a direction approaching the steering axis. As another embodiment, the position of the plurality of power line connecting portion in the vehicle front-rear direction is disposed to overlap with the position of the steering axis in the vehicle front-rear direction.

The power line connecting portion is preferably provided in the terminal box. Although the structure of the power line connecting portion is not particularly limited, it should be understood as at least including a through-hole formed on the casing of the in-wheel motor drive device and through which an end of the power line is passed through. As a preferred embodiment of the present invention, the power line connecting portion is configured of a through-hole formed in the casing, and a sleeve surrounding an outer periphery of an end of the power line and adapted to be inserted into and fixed to the through-hole. According to such an embodiment, the end of the power line can be held firmly at the sleeve. Moreover, sealability of the power line connecting portion improves, thus allowing for securely preventing water and dust from entering inside the power line connecting portion from outside the casing.

Advantageous Effects of Invention

As such, according to the present invention, the bending and stretching load on the power lines can be reduced at each power line connecting portion and can relieve the bending of the power lines at a time of steering the wheels, thus lengthening the life of the power lines. Moreover, it is possible to eliminate the difference in bending degrees between power lines and the difference in displacement, and make the life of the plurality of power lines even. Moreover, the clamp members may be reduced, therefore allowing to provide a sufficient number of cooling fins on the surface of the in-wheel motor drive device. Therefore, this improves the cooling effect of the in-wheel motor drive device. Accordingly, the performance of the in-wheel motor drive device improves.

DESCRIPTION OF EMBODIMENTS

Figure 1:
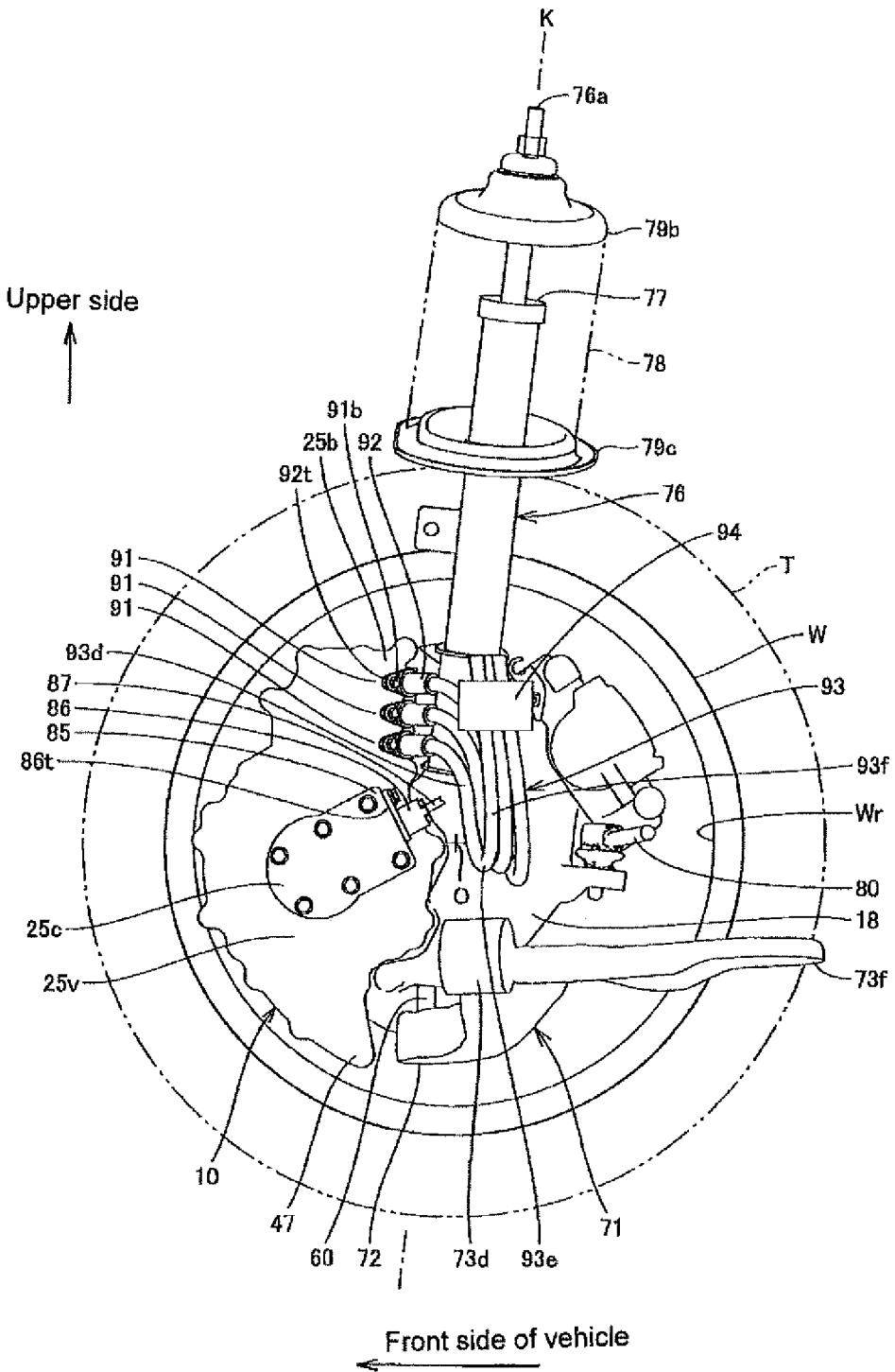
FIG. 1 is a schematic view showing a wiring arrangement of an in-wheel motor power line serving as a first embodiment of the present invention, and shows a state viewed from an inner side in a vehicle width direction.
Figure 2:
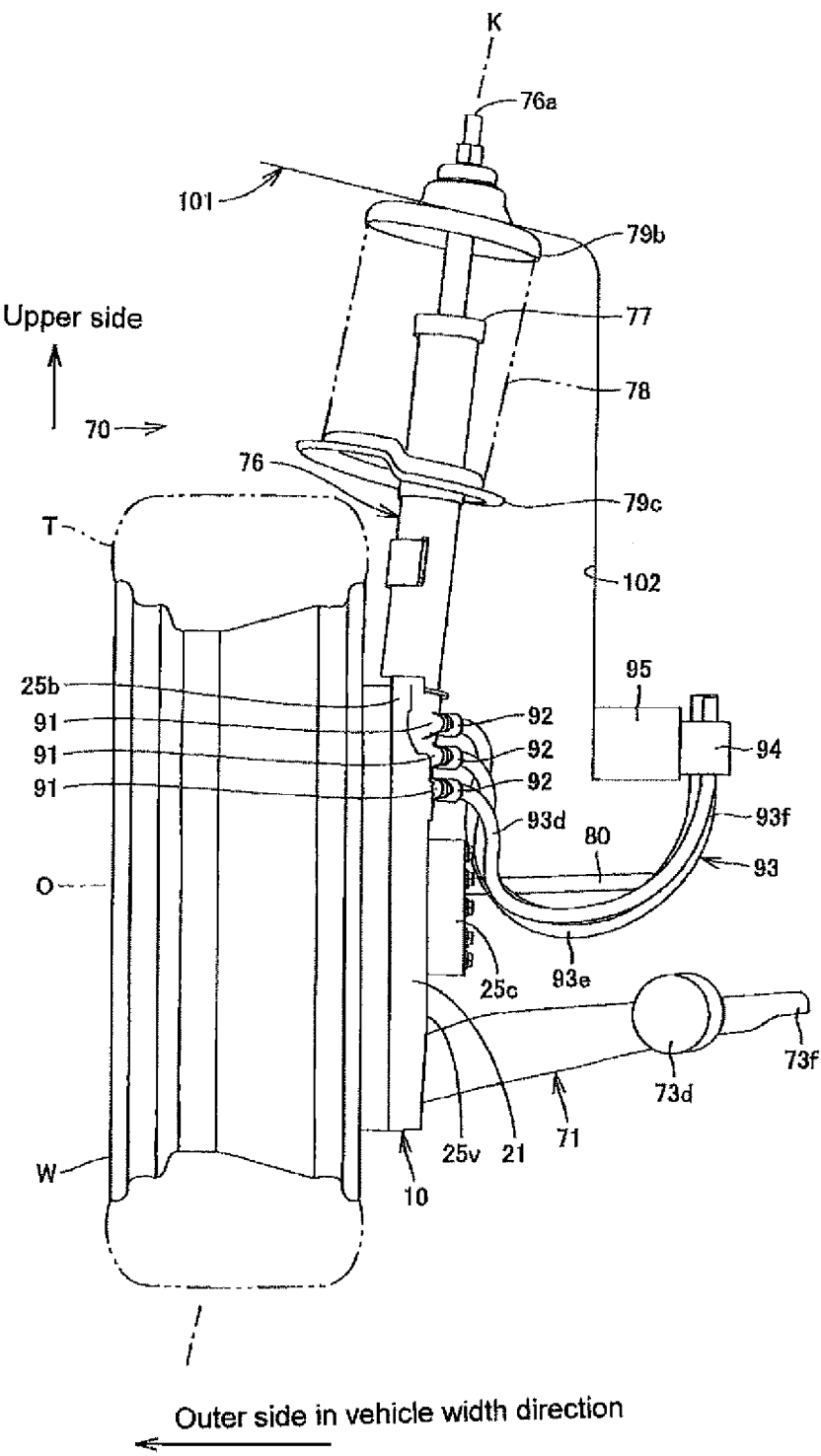
FIG. 2 is a schematic view showing the first embodiment, and shows a state viewed from a front side of the vehicle.
Figure 3:
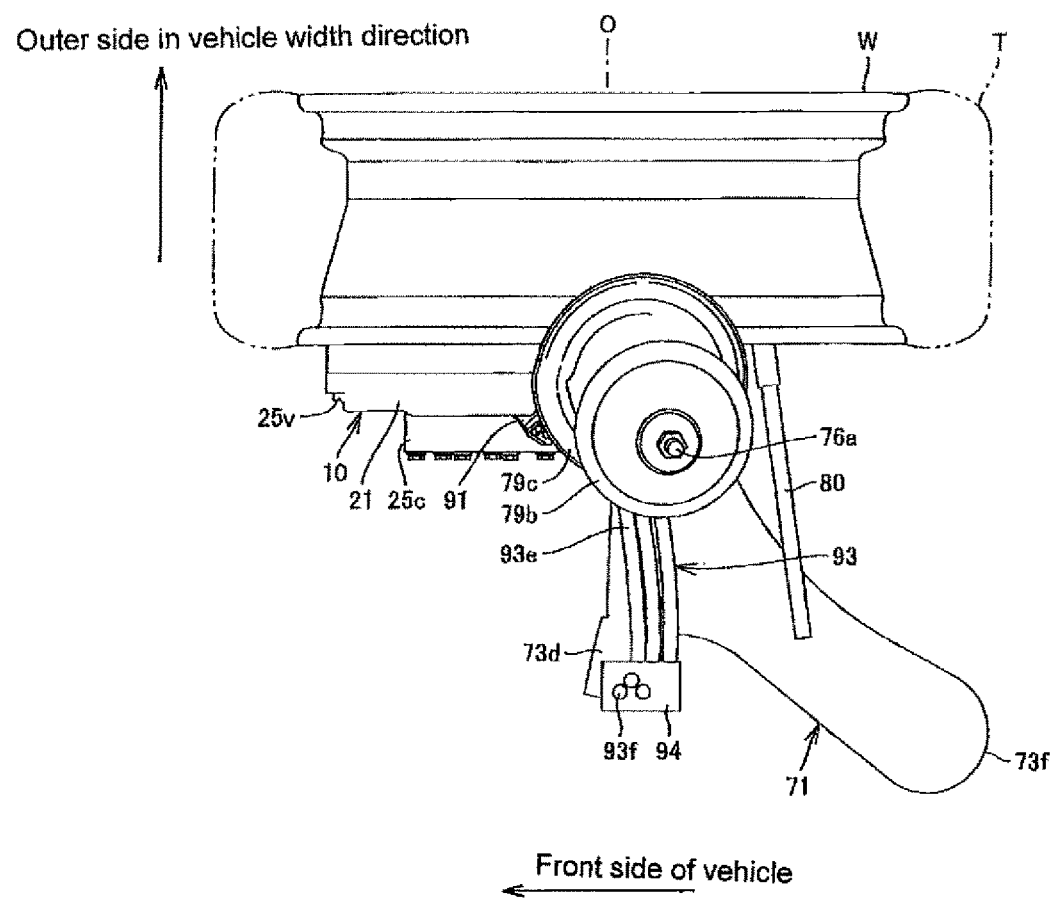
FIG. 3 is a schematic view showing the first embodiment, and shows a state viewed from above the vehicle.

The embodiments of the present invention will be described below in detail, with reference to the drawings. FIG. 1 is a schematic view showing a wiring arrangement of in-wheel motor power lines serving as a first embodiment of the present invention, and shows a state viewed from an inner side in the vehicle width direction. FIG. 2 is a schematic view showing the same embodiment, and shows a state viewed from the front side of the vehicle. FIG. 3 is a schematic view showing the same embodiment, and shows a state viewed from above. In the first embodiment, a wheel W, an in-wheel motor drive device 10, and a suspension device 70 are disposed on an outer side in the vehicle width direction of a vehicle body 101 (showing only the outer side part in the vehicle width direction of the vehicle body in FIG. 2). Moreover, the wheel W, the in-wheel motor drive device 10, and the suspension device 70 are disposed symmetrically on both sides in the vehicle width direction of the vehicle body 101, and configures an electric vehicle.

A tire T shown by virtual lines fits around an outer periphery of the wheel W. The wheel W and the tire T configures a wheel. A rim part Wr of the wheel W defines an inner space region of the wheel. The in-wheel motor drive device 10 is disposed in such an inner space region. The in-wheel motor drive device 10 connects to the wheel W to drive the wheel.

The suspension device 70 is a strut-type suspension device, and includes a lower arm 71 extending in the vehicle width direction and a strut 76 disposed above the lower arm 71 and extending in a vertical direction. The strut 76 is disposed on a more inner side in the vehicle width direction than the wheel W and the in-wheel motor drive device 10, a lower end of the strut 76 couples to the in-wheel motor drive device 10, and an upper end of the strut 76 connects to the vehicle body 101 above the wheel W. The strut 76, the upper part of the wheel W, and the upper part of the in-wheel motor drive device 10 are housed inside a wheel house 102 formed on the outer side of the vehicle body 101 in the vehicle width direction.

The strut 76 is a vertically extendable suspension member having a shock absorber 77 built in in its upper end region. On the outer periphery of the shock absorber 77, a coil spring 78 whose outline is shown by virtual lines is disposed, which coil spring 78 relaxes an axial force in the vertical direction that is applied on the strut 76. One pair of spring sheets 79b, 79c are provided on the upper end and the center portion of the strut 76, respectively, which spring sheets sandwich and hold the upper end and lower end of the coil spring 78. Inside the shock absorber 77 provides a damper that attenuates the axial force applied on the strut 76.

The lower arm 71 is a suspension member disposed lower than an axis O of the in-wheel motor drive device 10, and includes a vehicle width direction outer end 72 and vehicle width direction inner ends 73d, 73f. The lower arm 71 is connected to the in-wheel motor drive device 10 via a ball joint 60 at the vehicle width direction outer end 72. Moreover, the lower arm 71 is connected to a vehicle body side member not illustrated at the vehicle direction inner ends 73d, 73f. The lower arm 71 is swingable in the vertical direction, having the vehicle width direction inner ends 73d, 73f serve as base ends and the vehicle width direction outer end 72 serve as a free end. The vehicle body side member is a member attached on the vehicle body side from when viewed from the member described. A straight line connecting the vehicle direction outer end 72 and the vehicle direction upper end 76a of the strut 76 extend in the vertical direction and configure a steering axis K. The steering axis K basically extends in the vertical direction, however may slightly be inclined in the vehicle width direction and/or vehicle front-rear direction. When the vehicle width direction inner end 73d, 73f are not distinguished in the drawing, the reference numeral of 73 is simply applied.

A tie rod 80 is disposed above the lower arm 71. The tie rod 80 extends in the vehicle width direction, and an outer end of the tie rod 80 in the vehicle width direction connects with the in-wheel motor drive device 10 in a rotatable manner. An inner end of the tie rod 80 in the vehicle width direction connects with a steering device not illustrated. The steering device causes the tie rod 80 to move forward and backwards in the vehicle width direction, and causes the in-wheel motor drive device 10 and the wheel W to steer about the steering axis K.

Next describes the in-wheel motor drive device.

Figure 4:
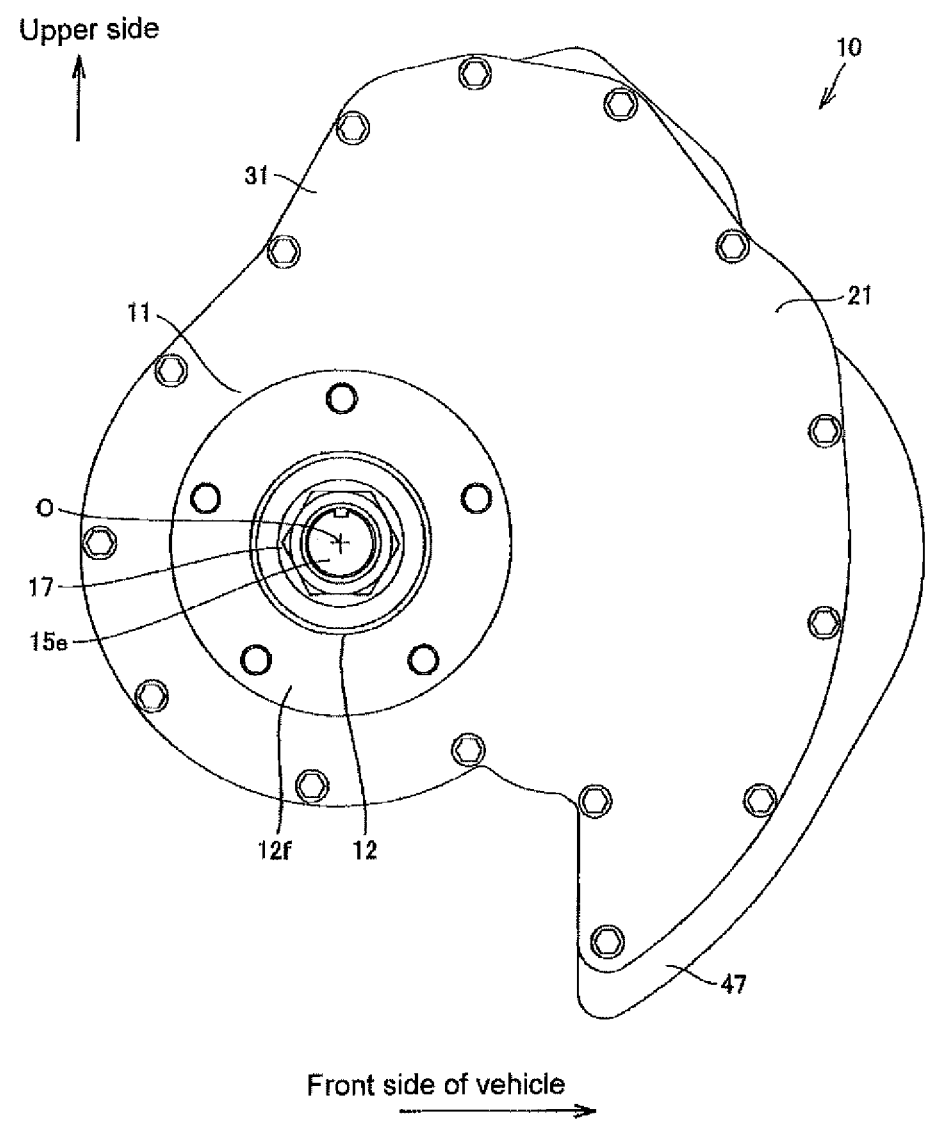
FIG. 4 is a schematic view showing an in-wheel motor drive device, and shows a state viewed from an outer side in a vehicle width direction.
Figure 5:
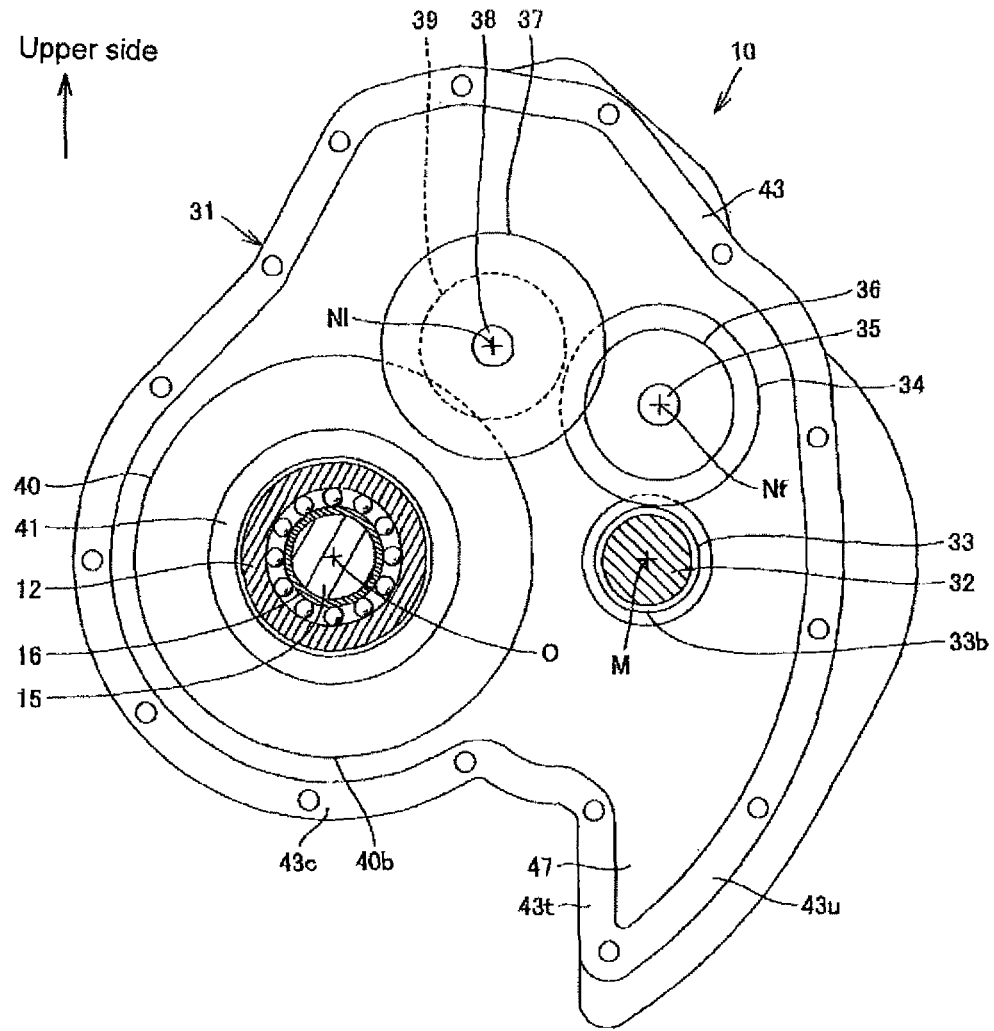
FIG. 5 is a lateral section view showing an in-wheel motor drive device.
Figure 6:
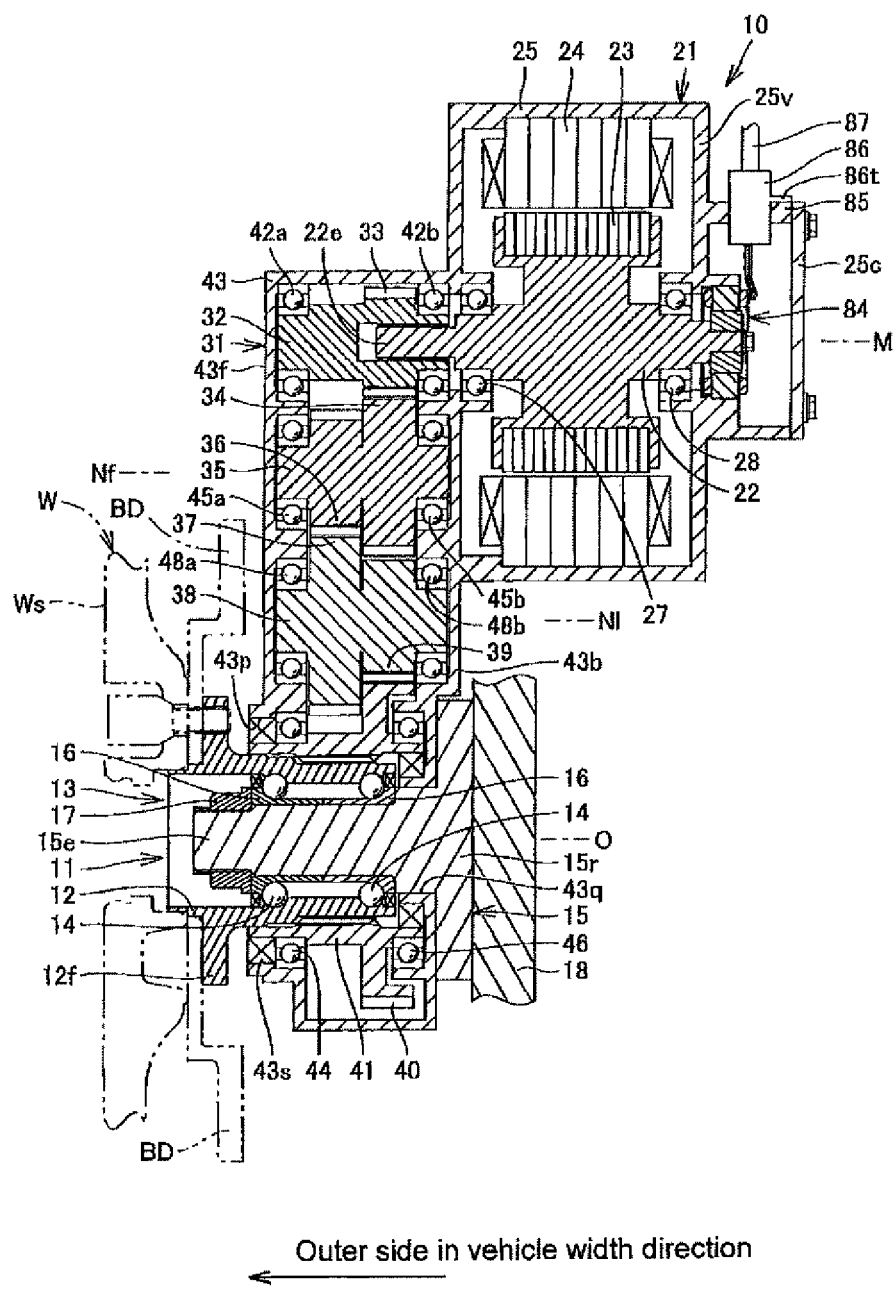
FIG. 6 is a developed section view showing an in-wheel motor drive device.
Figure 7:
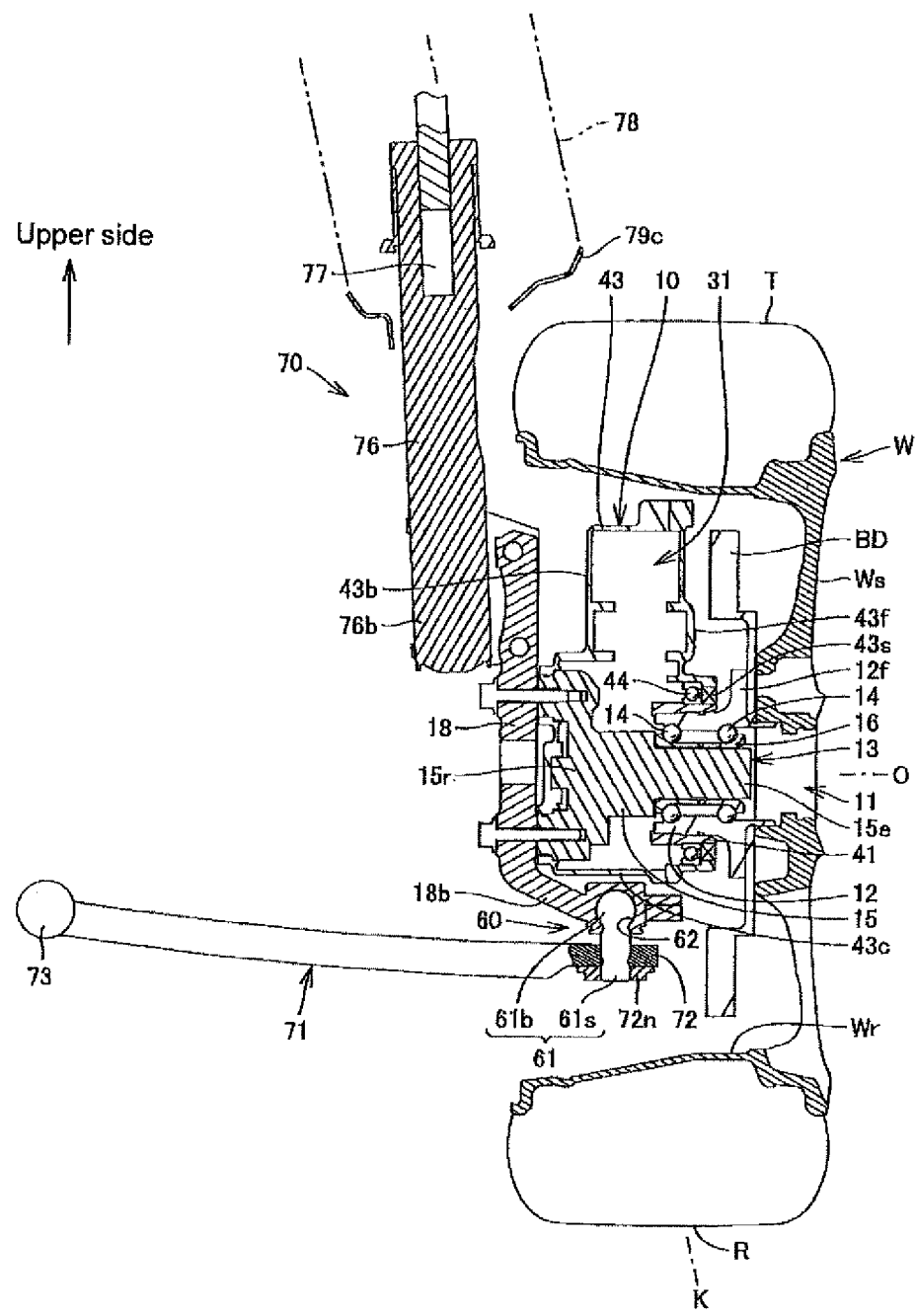
FIG. 7 is a longitudinal section view schematically showing an in-wheel motor drive device and a suspension device.

FIG. 4 is a schematic view taking out and showing the in-wheel motor drive device shown in FIGS. 1 to 3, and shows a state viewed from the outer side in the vehicle width direction. FIG. 5 is a lateral section view showing the in-wheel motor drive device, and schematically shows a state viewed from the outer side in the vehicle width direction. In FIG. 5, each gear within a reducer unit is shown as an addendum circle, and individual teeth have been omitted in illustration. FIG. 6 is a developed section view schematically showing the in-wheel motor drive device. The section plan shown in FIG. 6 is a developed plan view connecting a plan view including an axis M and an axis Nf shown in FIG. 5, a plan view including the axis Nf and an axis Nl, and a plan view including the axis Nl and an axis O, in this order. FIG. 7 is a longitudinal section view showing the in-wheel motor drive device, and shows this together with the wheel and the suspension device. In order to avoid complexity in the drawings, in FIG. 7, each gear within the reducer unit is omitted in illustration.

The in-wheel motor drive device 10 includes: a wheel hub bearing unit 11 connecting with a center of a wheel W being represented by a virtual line as shown in FIG. 6; a motor unit 21 that drives the wheel W of the wheel; and a reducer unit 31 that reduces the rotation of the motor unit and transmits this to the wheel hub bearing unit 11, and is disposed in a wheel house (not shown) of an electric motor vehicle. The motor unit 21 and the reducer unit 31 are not disposed coaxially to the axis O of the wheel hub bearing unit 11, but are disposed offset from the axis O of the wheel hub bearing unit 11 as shown in FIG. 5. The in-wheel motor drive device 10 can make the electric motor vehicle run at a speed of 0 to 180 km/h on a public road.

As shown in FIG. 6, the wheel hub bearing unit 11 has an outer ring 12 as a wheel hub that couples to the wheel W, an inner fixing member 13 passed through a center hole of the outer ring 12, and a plurality of rolling elements 14 disposed in a ring-shaped gap between the outer wheel 12 and the inner fixing member 13, and configures an axle. The inner fixing member 13 includes an unrotating stationary shaft 15, a pair of inner races 16, a lock nut 17, and a carrier 18. The stationary shaft 15 is formed to have a diameter larger at its root part 15r than at its tip part 15e. The inner races 16 fit with the outer periphery of the stationary shaft 15, between the root part 15r and the tip part 15e. The lock nut 17 is screwed to the tip part 15e of the stationary shaft 15, and fixes the inner races 16 between the lock nut 17 and the root part 15r.

The stationary shaft 15 extends along the axis O, and penetrates through a body casing 43 that serves as a contour of the reducer unit 31. The tip part 15e of the stationary shaft 15 penetrates through an opening 43p formed in a front part 43f of the body casing 43, and protrudes outwards in the vehicle width direction than the front part 43f. The root part 15r of the stationary shaft 15 penetrates through an opening 43q formed in a back part 43b, from an inner side in the vehicle width direction than the back part 43b of the body casing 43. The front part 43f and the back part 43b are wall portions that face each other with a space provided therebetween in the axis O direction. The carrier 18 is attached and fixed to the root part 15r. The carrier 18 connects with the suspension device 70 and the tie rod 80 at outside the body casing 43.

The rolling element 14 is arranged in multiple rows separated in the axis O direction. An outer periphery surface of the inner races 16 on one side in the axis O direction configures an inner race surface for a first row of the rolling element 14, and faces an inner periphery surface of the one side in the axis O direction of the outer ring 12. The outer periphery surface of the inner race 16 on the other side in the axis O direction configures an inner race surface for a second row of the rolling element 14, and faces an inner periphery surface of the other side in the axis O direction of the outer ring 12. In the following description, the outer side in the vehicle width direction (outboard side) is also referred to as one side in an axial direction, and an inner side in the vehicle width direction (inboard side) is also referred to as the other side in the axial direction. The left-right directions in the drawing of FIG. 6 corresponds to the vehicle width direction. The inner periphery surface of the outer ring 12 configures the outer race surface of the rolling element 14.

A flange unit 12f is formed on one end in the axis O direction of the outer ring 12. The flange unit 12f configures a coupling seat portion for coaxially coupling a brake disk BD and a spoke portion Ws of the wheel W. The outer ring 12 couples to the brake disk BD and the wheel W at the flange unit 12f, and rotates integrally with the wheel W. In a modification not shown, the flange unit 12f may be a protruding portion that protrudes to an outer diameter side and having a space provided in a circumferential direction.

As shown in FIG. 6, the motor unit 21 has a motor rotating shaft 22, a rotor 23, a stator 24, a motor casing 25, and a motor casing cover 25v, and these are disposed successively in this order from the axis M of the motor unit 21 to an outer diameter side. The motor unit 21 is a radial gap motor with an inner rotor and outer stator form, however this may be of another form. For example, although not shown, the motor unit 21 may be an axial gap motor.

The axis M serving as the center of rotation for the motor rotating shaft 22 and the rotor 23 extends parallel to the axis O of the wheel hub bearing unit 11. Namely, the motor unit 21 is disposed offset, to be away from the axis O of the wheel hub bearing unit 11. An axial directional position of most parts of the motor unit 21 excluding the tip part of the motor rotating shaft 22 does not overlap with an axial directional position of the inner fixing member 13, as shown in FIG. 6. The motor casing 25 is tubular shaped, couples to the back part 43b of the body casing 43 at one end in the axis M direction, and is sealed to the motor casing cover 25v of a lid-shape at the other end in the axis M direction. Both end parts of the motor rotating shaft 22 are rotatably supported to the motor casing 25 and to the motor casing cover 25v via rolling-element bearings 27, 28. The motor unit 21 drives the outer ring 12 and the wheel.

As shown in FIG. 1, a power line terminal box 25b is provided on an upper part of the in-wheel motor drive device 10. The power line terminal box 25b is formed across an upper part of the motor casing 25 (FIG. 6) and an upper part of the motor casing cover 25v (FIG. 6). The power line terminal box 25b of the present embodiment has three power line connecting portions 91 formed on the motor casing cover 25 (FIG. 6), and receives three-phase AC power. To each of the power line connecting portions 91, one end of the power line 93 is connected. A core wire of the power line 93 connects with a lead extending from a coil of the stator 24, at the inside of the power line terminal box 25b.

A signal line terminal box 25c is formed in a center portion of the motor casing cover 25v. The signal line terminal box 25c is separated away from the power line terminal box 25b. The signal line terminal box 25c is disposed intersecting with the axis M, as shown in FIG. 6. The signal line terminal box 25c houses a rotation angle sensor 84. The rotation angle sensor 84 is provided on an end part in the axial direction of the motor rotating shaft 22, and detects a rotating angle of the motor rotating shaft 22. The signal line terminal box 25c is provided with a signal line connecting portion 85. The signal line connecting portion 85 has a wall part of the signal line terminal box 25c, a through-hole that penetrates through the wall part, and a female screw hole (not shown) provided in the wall part close to this through-hole. Furthermore, the signal line connecting portion 85 is provided with a sleeve 86, and the sleeve 86 and the signal line 87 pass through the through-hole. The sleeve 86 is of a tubular body, fits tightly around the entire outer periphery of the signal line 87, protects the signal line 87, and seals a ring-shaped gap between the through-hole and the signal line 87. On the outer periphery surface of the sleeve, a tongue portion 86t that projects in a sleeve outer diameter direction is formed. A bolt not shown in FIG. 6 is screwed into the tongue portion 86t and the female screw hole of the signal line connecting portion 85, and by this the sleeve 86 is attached and fixed to the signal line connecting portion 85.

The signal line 87 is configured of a plurality of core wires made from a conductor and a coating part made from an insulator that coats the plurality of core wires in a bundling manner, and is bendable. One end of the signal line 87 connects with the signal line connecting portion 85. Although not shown, the signal line 87 extends from one end to the vehicle 101 (FIG. 2).

Each of the power line connecting portions 91 are also configured similarly to the signal line connecting portion 85, and have a wall part of the power line terminal box 25b, a through-hole that penetrates through the wall part, and a female screw hole (not shown) provided in the wall part close to this through-hole. Furthermore, a sleeve 92 is provided to each of the power line connecting portions 91. The sleeve 92 and one end of the power line 93 are passed through the through-hole. The sleeve 92 and the power line 93 extend out from the through-hole of the power line connecting portion 91 to the vehicle body 101 side. The power line 93 passes through to the sleeve 92, and extends out from the sleeve 92 to the vehicle 101 side. Each of the sleeves 92 are of a tubular shape, adhere closely to the outer periphery of the power lines 93, and protect the power lines 93. Moreover, each of the sleeves 92 is inserted and fixed to the through-hole of the power line connecting portions 91 together with the one ends of the power lines 93, holds the one ends of the power lines 93, and further seals ring-shaped gaps between the power lines 93 and the through-hole. In order to prevent the sleeve 92 from slipping out, a tongue portion 92t is formed on the outer periphery surface of the sleeve 92, which tongue portion 92t protrudes in the sleeve outer diameter direction. A bolt 91b shown in FIG. 1 is screwed onto the tongue portion 92t and the female screw hole of the power line connecting portion 91, and by this the sleeve 92 is attached and fixed to the power line connecting portion 91.

The reducer unit 31 has an input shaft 32, an input gear 33, an intermediate gear 34, an intermediate shaft 35, an intermediate gear 36, an intermediate gear 37, an intermediate shaft 38, an intermediate gear 39, an output gear 40, an output shaft 41, and the body casing 43. The input shaft 32 is a tubular body having a larger diameter than a tip part 22e of the motor rotating shaft 22, and extends along the axis M of the motor unit 21. The tip part 22e is received inside a center hole on the other end of the input shaft 32 in the axis M direction, and the input shaft 32 couples coaxially with the motor rotating shaft 22. Both ends of the input shaft 32 are supported by the body casing 43 via rolling-element bearings 42a, 42b. The input gear 33 is an external gear having a smaller diameter than the motor unit 21, and couples coaxially to the input shaft 32. More specifically, the input gear 33 is formed integrally with the outer periphery of a center portion of the input shaft 32 in the axis M direction.

The output shaft 41 is a tubular body having a larger diameter than the outer ring 12, and extends along the axis O of the wheel hub bearing unit 11. The other end of the outer ring 12 in the axis O direction is received in a center hole at the one end in the axis O direction of the output shaft 41, and the output shaft 41 couples coaxially to the outer ring 12. On the outer periphery on both ends of the output shaft 41 in the axis O direction, rolling-element bearings 44, 46 are disposed. The one end of the output shaft 41 in the axis O direction is supported by the front part 43f of the body casing 43 via the rolling-element bearing 44. The other end of the output shaft 41 in the axis O direction is supported by the back part 43b of the body casing 43 via the rolling-element bearing 46. The output gear 40 is an external gear, and couples coaxially to the output shaft 41. More specifically, the output gear 40 is formed integrally with the outer periphery of the other end of the output shaft 41 in the axis O direction.

The two intermediate shafts 35, 38 extend parallel to the input shaft 32 and the output shaft 41. Namely, the reducer unit 31 is a quadruple-shaft parallel shaft gear reducer, and the axis O of the output shaft 41, the axis Nf of the intermediate shaft 35, the axis Nl of the intermediate shaft 38, and the axis M of the input shaft 32 each extend parallel to each other, in other words, extend in the vehicle width direction.

Describing in relation to the front-to-rear direction position of the vehicle of each shaft, as shown in FIG. 5, the axis M of the input shaft 32 is disposed in the vehicle anterior of the axis O of the output shaft 41. Moreover, the axis Nf of the intermediate shaft 35 is disposed in the vehicle anterior of the axis M of the input shaft 32. The axis Nl of the intermediate shaft 38 is disposed in the vehicle anterior of the axis O of the output shaft 41 and disposed in the vehicle posterior of the axis M of the input shaft 32. As a modification not shown, the axis M of the input shaft 32, the axis Nf of the intermediate shaft 35, the axis Nl of the intermediate shaft 38, and the axis O of the output shaft 41 may be disposed in the front-to-rear direction in this order. This order will also be the order in which the drive force will be transmitted.

Describing in relation to the vertical directional positions of each axis, the axis M of the input shaft 32 is arranged above the axis O of the output shaft 41. The axis Nf of the intermediate axis 35 is arranged above the axis M of the input shaft 32. The axis Nl of the intermediate shaft 38 is arranged above the axis Nf of the intermediate shaft 35. The plurality of the intermediate shafts 35, 38 are sufficient as long as they are arranged above the input shaft 32 and the output shaft 41, and as a modification not shown, the intermediate shaft 35 may be arranged above the intermediate shaft 38. Alternatively, as a modification not shown, the output shaft 41 may be arranged above the input shaft 32.

The intermediate gear 34 and the intermediate gear 36 are external gears, and coaxially couple to a center part of the intermediate shaft 35 in the axis Nf direction as shown in FIG. 1. Both ends of the intermediate shaft 35 are supported by the body casing 43 via rolling-element bearings 45a, 45b. The intermediate gear 37 and the intermediate gear 39 are external gears, and coaxially couple to a center part of the intermediate shaft 38 in the axis Nl direction. Both ends of the intermediate shaft 38 are supported by the body casing 43 via rolling-element bearings 48a, 48b.

The body casing 43 constitutes the contour of the reducer unit 31 and the wheel hub bearing unit 11, is formed in a tubular shape, and surrounds the axes O, Nf, Nl, and M as shown in FIG. 5. Moreover, the body casing 43 is housed inside an inner space region of the wheel W, as shown in FIG. 7. The inner space region of the wheel W is defined by an inner periphery surface of a rim portion Wr, and a spoke portion Ws that couples to one end of the rim part Wr in the axis O direction. The wheel hub bearing unit 11, the reducer unit 31, and one region of the motor unit 21 in the axial direction are then housed within the inner space region of the wheel W. Moreover, the other region in the axial direction of the motor unit 21 protrudes out to the other side in the axial direction from the wheel W. As such, the wheel W houses most part of the in-wheel motor drive device 10.

With reference to FIG. 5, the body casing 43 has a directly below portion 43c of the axis O, and a portion protruding downwards at a position away from the axis O of the output gear 40 in the vehicle front-rear direction, more specifically directly below the axis M of the input gear 33. This protruding portion forms an oil tank 47, and is positioned lower than the directly below portion 43c.

With reference to FIG. 7, a lower end 18b of the carrier 18 and a vehicle width direction outer end 72 of the lower arm 71 are disposed directly below the directly below portion 43e, and the vehicle width direction outer end 72 and the lower end 18b are connected via the ball joint 60 free in direction. As shown in FIG. 5, viewing from the axis O direction, the oil tank 47 is divided by a substantially vertical rear side wall portion 43t and an inclined front side wall portion 43u, and is made into a triangular shape tapering downwards. The rear side wall portion 43t faces the ball joint 60 (FIG. 7) in the vehicle front-rear direction, having a space provided therebetween. The front side wall portion 43u faces a front side portion and a lower side portion among the rim part Wr (FIG. 7).

The ball joint 60 includes a ball stud 61 and a socket 62 as shown in FIG. 7. The ball stud 61 extends in the vertical direction, and has a ball portion 61b formed on its upper end and a stud portion 61s formed on its lower end. The socket 62 is provided in the inner fixing member 13, and houses the ball portion 61b in a slidable manner. The stud portion 61s penetrates the vehicle width direction outer end 72 of the lower arm 71 in the vertical direction. A male screw is formed on an outer periphery on the lower end of the stud portion 61s, and with a nut 72n being screwed from below, the stud portion 61s is attached and fixed to the lower arm 71. As shown in FIG. 1, the ball joint 60 is positioned above the lower end of the oil tank 47. The ball joint 60 and the oil tank 47 are disposed in the inner space region of the wheel W, the ball joint 60 is disposed directly below the axis O, and the oil tank 47 is disposed away from the ball joint 60 in the vehicle front-rear direction. Moreover, the ball joint 60 is disposed on the outer side in the vehicle width direction than the back part 43b as shown in FIG. 7. The steering axis K extends in the vertical direction passing through the ball center of the ball portion 61b, and intersects with the stationary shaft 15 and a ground plane R of the tire T. An upper end of the carrier 18 is attached and fixed to the lower end of the strut 76.

The body casing 43 is tubular shaped, and, as shown in FIG. 6, houses the input shaft 32, the input gear 33, the intermediate gear 34, the intermediate gear 35, the intermediate gear 36, the intermediate gear 37, the intermediate shaft 38, the intermediate gear 39, the output gear 40, the output shaft 41, and the center portion in the axis O direction of the wheel hub bearing unit 11. The body casing 43 encapsulates lubricating oil inside, and the reducer unit 31 is lubricated. The input gear 33, the intermediate gear 34, the intermediate gear 36, the intermediate gear 37, the intermediate gear 39, and the output gear 40 are helical gears.

The body casing 43 has a tubular portion including the directly below portion 43c and the oil tank 47 as shown in FIG. 5, a substantially flat front part 43f that covers the one side in the axial direction of the tubular part of the reducer unit 31 as shown in FIG. 6, and a substantially flat back part 43b that covers the other side in the axial direction of the tubular portion of the reducer unit 31. The back part 43b couples with the motor casing 25. Moreover, the back part 43b couples with the stationary shaft 15.

The front part 43f is formed with an opening 43p for the outer ring 12 to pass therethrough. The opening 43p has a sealing material 43s that seals the ring-shaped gap with the outer ring 12. Therefore, the outer ring 12 that serves as a rotatable body is housed in the body casing 43 except for the one end in the axis O direction. The inner peripheral surface on the other end in the axis O direction of the outer ring 12 has a sealing material 43v disposed. The sealing material 43v seals the ring-shaped gap between the outer ring 12 and the back part 43b.

The input gear 33 with a small diameter and the intermediate gear 34 with the large diameter are disposed on the other side in the axial direction of the reducer 31 (motor unit 21 side), and mesh with each other. The intermediate gear 36 with the small diameter and the intermediate gear 37 with the large diameter are disposed on the one side in the axial direction of the reducer 31 (flange unit 12f side), and mesh with each other. The intermediate gear 39 with the small diameter and the output gear 40 with the large diameter are disposed on the other side in the axial direction of the reducer 31, and mesh with each other. As such, the input gear 33, the plurality of intermediate gears 34, 36, 37, 39, and the output gear 40 mesh with each other, and configure a drive transmission path leading to the output gear 40 from the input gear 33 through the plurality of intermediate gears 34, 36, 37, 39. Due to the above meshing of the small diameter gears with the large diameter gears, the rotation of the input shaft 32 is reduced in speed at the intermediate shaft 35, the rotation of the intermediate shaft 35 is reduced in speed at the intermediate shaft 38, and the rotation of the intermediate shaft 38 is reduced in speed at the output shaft 41. Thus, the reducer unit 31 can secure a sufficient reduction ratio. The intermediate gear 34 among the plurality of intermediate gears will serve as a first intermediate gear positioned on an input side of the drive transmission path. The intermediate gear 39 among the plurality of intermediate gears will serve as a final intermediate gear positioned on an output side of the drive transmission path.

As shown in FIG. 5, the output shaft 41, the intermediate shaft 38, and the input shaft 32 are disposed in this order, with a space provided therebetween in the front-to-rear direction of the vehicle. Furthermore, the intermediate shaft 35 and the intermediate shaft 38 are disposed above the input shaft 32 and the output shaft 41. According to such a first embodiment, an intermediate shaft may be disposed upper of the outer ring 12 that serves as a wheel hub, to secure a space for disposing the oil tank 47 below the outer ring 12 or to secure a space for receiving the ball joint 60 (FIG. 7) directly below the outer ring 12. Therefore, the steering axis K extending in the vertical direction can be provided intersecting with the wheel hub bearing unit 11, and can allow for suitably steering the wheel W and the in-wheel motor drive device 10 about the steering axis K.

Next describes the wiring arrangement of the in-wheel motor power lines.

Figure 8:
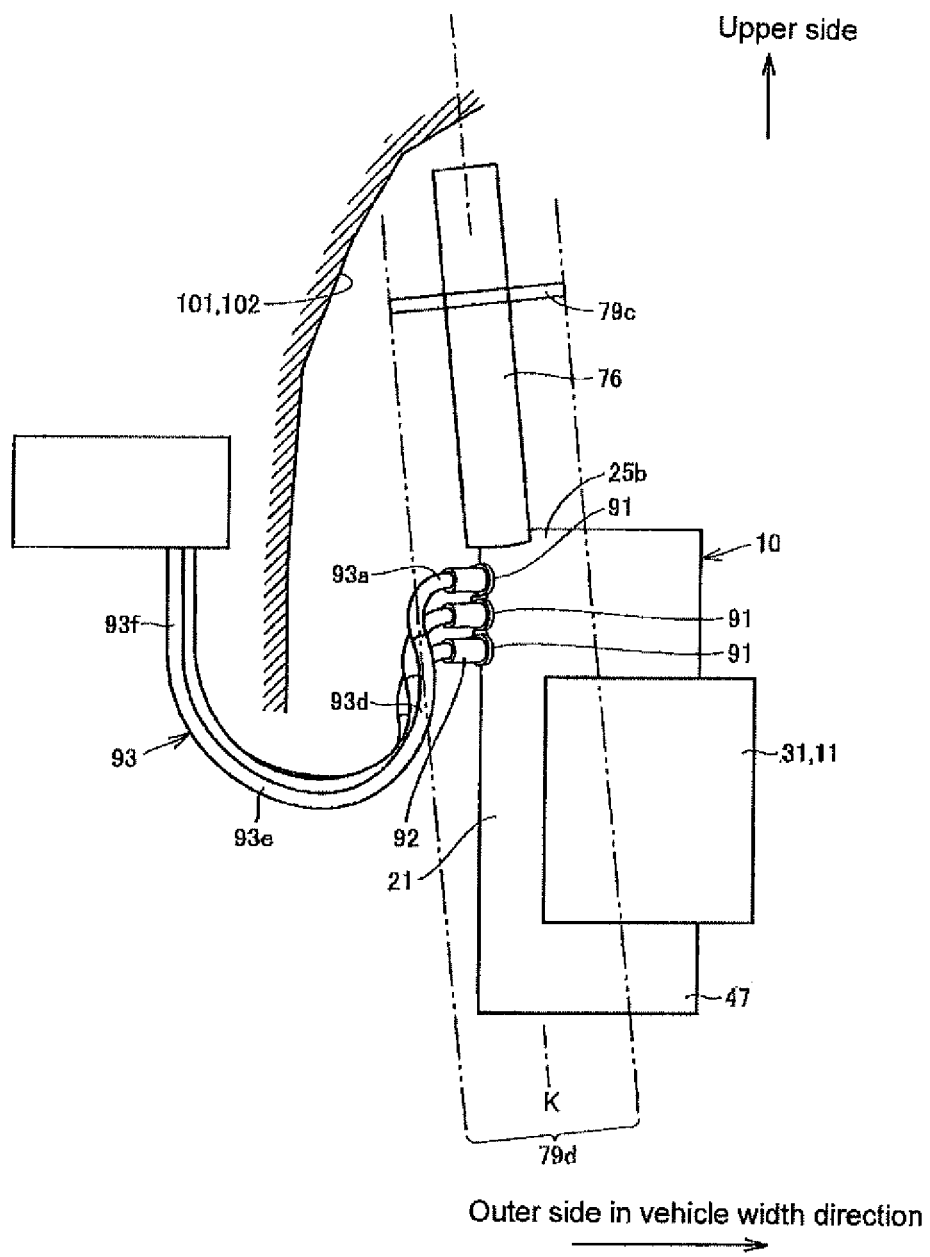
FIG. 8 is a schematic view showing an in-wheel motor drive device and power lines, and shows a state viewed from a rear side of the vehicle.
Figure 9:
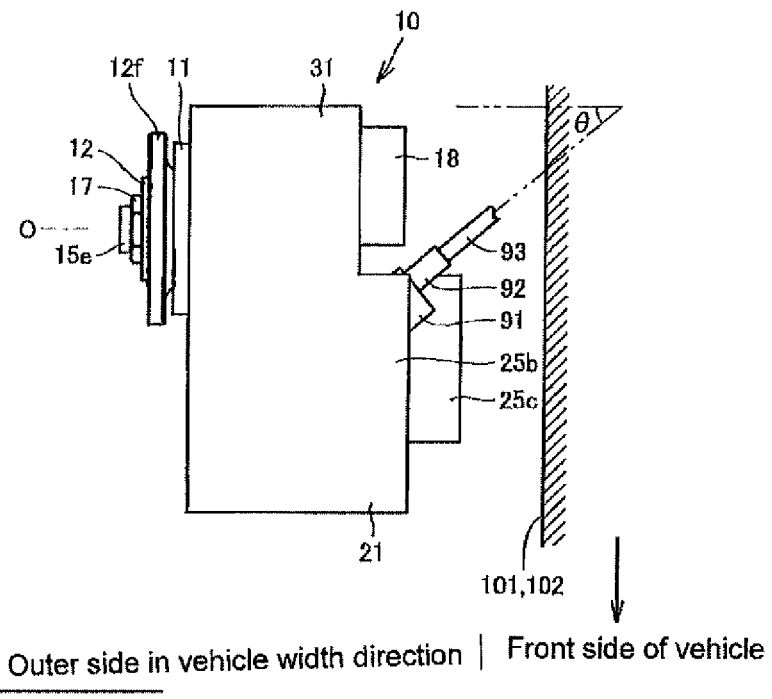
FIG. 9 is a schematic view showing an in-wheel motor drive device and power lines, and shows a state viewed from above the vehicle.

FIGS. 8 and 9 are schematic views showing the in-wheel motor drive device and the power lines; FIG. 8 represents a state viewed from the rear of the vehicle, and FIG. 9 represents a state viewed from above the vehicle. In the first embodiment, three power lines 93 extend from the in-wheel motor drive device 10 to the vehicle body 101. The three power lines 93 supply three-phase AC power from the vehicle body 101 to the motor unit 21. Each of the power lines 93 is configured of a core wire made from a conductor, and a coating part made from an insulator, which coating part covers the entire periphery of the core wire, and the power lines 93 are bendable. One ends of the power lines 93 are held by the power line connecting portions 91 and the sleeve 92 in such a manner that the other ends are in an inclined posture towards the rear of the vehicle and the inner side in the vehicle width direction. More specifically, the one ends of the power lines 93 are held in an inclined manner, in such a manner that a reference line parallel to the axle (axis O) in a straight direction not steered extends intersecting at angle θ°. The angle θ is a fixed value within a range not less than a maximum steering angle of α° to not more than 90° of the in-wheel motor drive device 10. When θ=90°, the one ends of the power lines 93 extend parallel to the vehicle front-rear direction. The other end of the power lines 93 connect to an inverter 103 installed in the vehicle body 101.

The one ends of the power lines 93 are aligned spaced apart in the steering axis K direction as shown in FIG. 8, and are disposed in an overlapping manner when viewed in the steering axis K direction as shown in FIG. 9. The one ends of the power lines 93 are disposed in such a manner that all the power line connecting portions 91 overlap on top of each other, as shown in FIG. 9.

Each of the power lines 93 includes three regions extending continuously between the one end and the other end of the power lines 93. Among these three regions, the region on a side connecting to the in-wheel motor drive device 10 is called an in-wheel motor drive device side region 93d, the region on a side connecting with the vehicle body 101 is called a vehicle body side region 93f, and the region between the in-wheel motor drive device side region 93d and the vehicle body side region 93f is called an intermediate region 93d.

The in-wheel motor drive device side region 93d extends in the vertical direction, connects to the in-wheel motor drive device 10 on an upper side of the in-wheel motor drive device side region 93d, and connects to the intermediate region 93d at a lower side of the in-wheel motor drive device side region 93e. The vehicle body side region 93f extends in the vertical direction, connects to the intermediate region 93e on a lower side of the vehicle body side region 93f and connects to the vehicle body 101 on an upper side of the vehicle body side region 93f. The intermediate region 93e has both sides of the intermediate region 93e serving as upper sides, and a middle part of the intermediate region 93e extends in a bent manner as a lower side.

The one ends of the power lines 93 that connect to the power line connecting portions 91 extend out in a horizontal direction toward the in-wheel motor drive device side region 93d, and then in a short while change the direction to downwards, and run to the upper side of the in-wheel motor drive device side region 93d. The in-wheel motor drive device side region 93d is not held by the clamp member.

As shown in FIG. 2, the plurality of power lines 93 is bundled by the clamp member 94 on the other end side than the vehicle body side region 93f, and is held to extend in the vertical direction. Therefore, the vehicle body side region 93f will extend in the vertical direction at a lower position than the clamp member 94 without being held by the clamp member. The clamp member 94 is attached and fixed to the vehicle body 101 via a bracket 95. By disposing the bracket 95 on the inner side in the vehicle width direction than the wheel house 102, the vehicle body side region 93f can be wired on the inner side in the vehicle width direction than the wheel house 102. Further, not only is it possible to wire the power lines 93 so as to detour the wheel house 102, it is also possible to bring a wall surface of the wheel house 102 closer to the in-wheel motor drive device 10 and reduce the size of the wheel house 102.

As shown in FIG. 2, the vertical directional position of the clamp member 94 overlaps with the vertical directional position of at least one of the three power line connecting units 91. Therefore, all of the power lines 93 are held to the in-wheel motor drive device 10 and the vehicle body 101 in a state bent in a U-shape extending downwards.

As shown in FIG. 1, the power line terminal box 25b and the three power line connecting units 91 are disposed in the vehicle anterior of the axis O, and the power line connecting portions 91 are directed to the vehicle posterior. This allows for wiring the in-wheel motor drive device side region 93d near the steering axis K. Alternatively, as a modification not illustrated, the power line terminal box 25b and the three power line connecting portions 91 may be disposed on the vehicle posterior of the axis O, and the power line connecting portions 91 may be directed to the vehicle anterior.

Moreover, in a straight state in which the wheel W is not steered, the three power line connecting portions 91 are disposed on the vehicle anterior of the axis O, and the clamp member 94 is disposed on the vehicle posterior of the axis O. This makes it possible to wire the in-wheel motor drive device side region 93d near the steering axis K. Alternatively, as a modification not illustrated, the three power line connecting portions 91 are disposed on the vehicle posterior of the axis O, and the clamp member 94 may be disposed on the vehicle anterior of the axis O. Either way, the vehicle front-rear directional position of the in-wheel motor drive device side region 93d should be disposed so that it overlaps the vehicle front-rear directional position of the vehicle body side region 93f in the straight state.

The in-wheel motor drive device side region 93d is disposed relatively on the outer side in the vehicle width direction, and the vehicle body side region 93f is disposed on the inner side in the vehicle width direction. Therefore, the intermediate region 93d extends in the vehicle width direction. The intermediate region 93e has both sides thereof hanging down by the in-wheel motor drive device side region 93d and the vehicle body side region 93f, and is not held by the clamp member and is floating in the air.

Next describes the power line connecting portions of the first embodiment.

Figure 10:
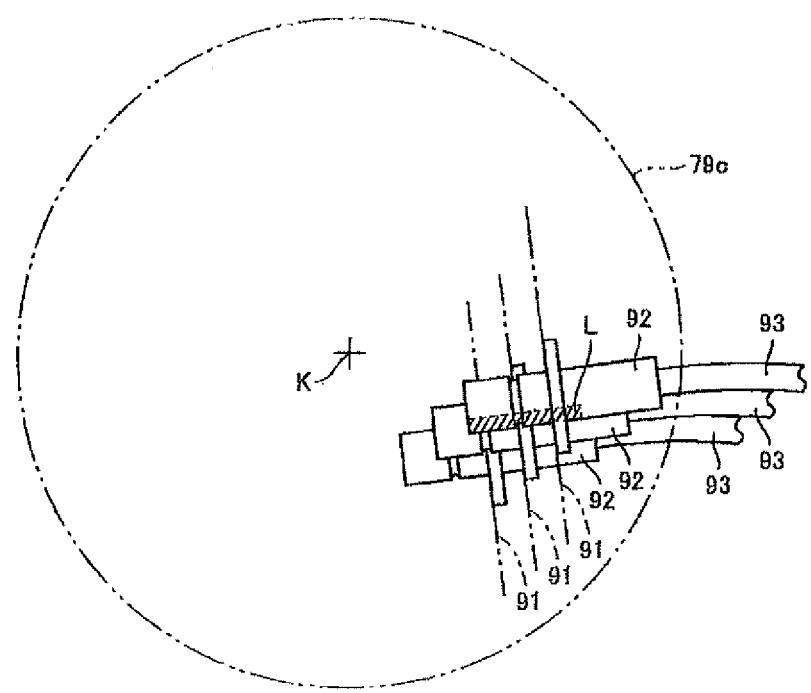
FIG. 10 is a schematic view showing the power lines and sleeves removed from the in-wheel motor drive device, and shows a state viewed from above in a steering axial direction.

FIG. 10 is a schematic view showing the power lines and the sleeves taken out from the in-wheel motor drive device, and represents a state looking down in the steering axis K direction from above. To avoid complexity in the drawings, in FIG. 10, the power line connecting portion 91 is represented by virtual lines. Each of the sleeves 92 have the same dimension and the same shape, and are disposed so that one part thereof overlaps when viewed from the steering axis K direction. An overlapping part L of the sleeves 92 are common for all three sleeves 92. Alternatively, although not illustrated, the sleeves 92 may be disposed so that the entire sleeves 92 overlap with the entirety of the other sleeves 92.

The sleeves 92 are disposed completely overlapping with the lower spring sheet 79c when viewed in the steering axis K direction. Alternatively, as a modification not illustrated, both of a sleeve 92 that completely overlaps with the lower spring sheet 79c and a sleeve 92 that partially overlaps with the lower spring sheet 79c can exist together.

The through-hole of the power line connecting portion 91 is formed on the wall part of the power line terminal box 25b (FIG. 9). While the sleeves 92 will be inserted and fixed thereto, these three through-holes are all disposed completely overlapping with the lower spring sheet 79c. Moreover, the through-hole of the power line connecting portions 91 and the other through-holes are disposed partially overlapping, when viewed in the steering axis K direction.

Figure 11:
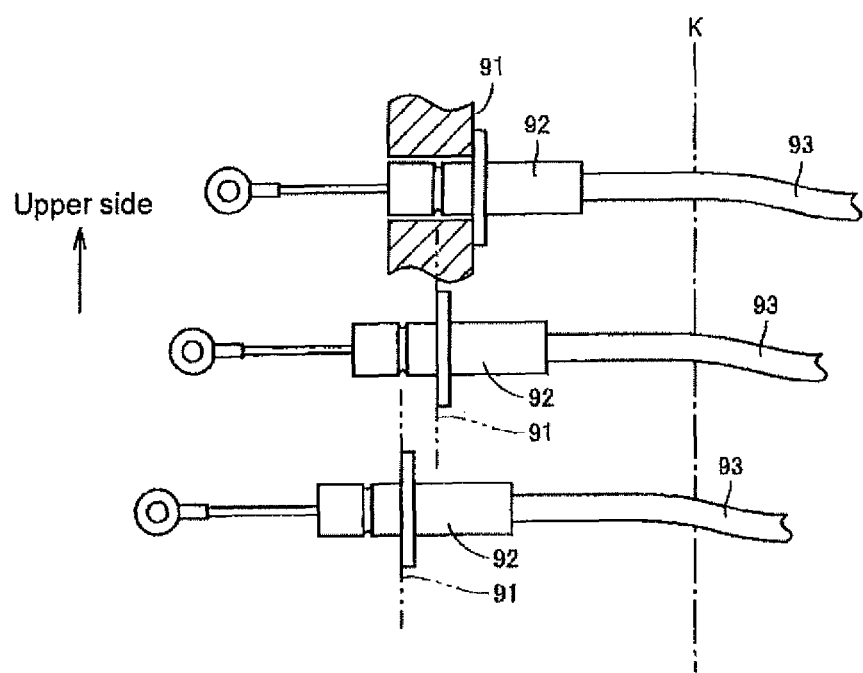
FIG. 11 is a schematic view showing the power lines and sleeves removed from the in-wheel motor drive device, and shows a state viewed in a vehicle width direction.

FIG. 11 is a schematic view showing the power lines and the sleeves taken out from the in-wheel motor drive device, and represents a state viewed in the vehicle width direction, corresponding to FIG. 10. To avoid complexity in the drawings, in FIG. 11, only one power line connecting unit 91 is represented in solid lines, and the others are represented by virtual lines. According to the present embodiment, distances from the steering axis K to the sleeves 92 are made substantially the same, as shown in FIGS. 10 and 11. Therefore, the stress acting on the power lines 93 at the time of steering can be made substantially the same. The plurality of power line connecting portions 91 are disposed shifted from the steering axis K in the vehicle front-rear direction, and one end of the power line 93 extending from the power line connecting portion 91 extends out in a direction approaching the steering axis K.

According to the first embodiment, each of the power lines 93 includes, between one end and the other end thereof, an in-wheel motor drive device side region 93d, an intermediate region 93e, and a vehicle body side region 93f, extending continuously. The in-wheel motor drive device side region 93d extends in the vertical direction, connects to the in-wheel motor drive device 10 on its upper side, and connects to the intermediate region 93e on its lower side. The vehicle body side region 93f extends in the vertical direction, connects to the intermediate region 93e at its lower side, and connects to the vehicle body 101 on its upper side. The intermediate region 93e has both sides serve as upper sides, and a middle part thereof bends and extends as its lower side. Accordingly, when the in-wheel motor drive device 10 is steered, the power lines 93 hardly change position, the bending degree of the intermediate region 93e hardly changes, and just the in-wheel motor drive device side region 93d twists. Therefore, the power lines 93 do not repetitively bend and stretch, and no bending fatigue accumulates in the power lines 93. Even if the strut 76 extends and the in-wheel motor drive device 10 bounds and rebounds in the vertical direction, this would only cause a slight change in the bending degree of the intermediate region 93e, and the power lines 93 will not be repetitively bent and stretched.

Moreover, according to the first embodiment, the vehicle body side region 93f extends in the vertical direction, and connects with the vehicle body 101 on its upper side; this allows for wiring the power lines 93 by detouring the wheel house 102. Therefore, there is no need to pierce a through-hole in the wheel house 102 to pass the power lines through that through-hole, thereby preventing the rigidity and strength of the wheel house 102 from decreasing. Moreover, it is possible to relocate the wall surface of the wheel house 102 to an outer side in the vehicle width direction than conventional techniques, thus allowing for bringing this closer to the in-wheel motor drive device 10. Therefore, the size of the wheel house 102 can be reduced than before, while increasing the size of the space within the vehicle than before.

Moreover, according to the first embodiment, the one ends of the power lines 93 extending from the power line connecting portions 91 are disposed so that at least one part thereof overlaps when viewed in the steering axis K direction; this makes it possible to dispose the one ends of all the power lines 93 in substantially same distances from the steering axis K. Therefore, the stress at the time of steering will not concentrate on a certain power line 93, thus allowing for making the life of the power lines 93 uniform.

Moreover, according to the first embodiment, since at least one of the in-wheel motor drive device side region 93d, the intermediate region 93e, and the vehicle body side region 93f is not held in any way, the regions can bend and twist freely. Therefore, the stress at the time of steering will not concentrate on a specific part in the regions, thus enabling to extend the life of the power lines 93.

Moreover, according to the first embodiment, the power lines 93 are held by the clamp member 94 provided in the vehicle body 101 more on the other side than the vehicle body side region 93f (vehicle body 101 side); this allows to make the vehicle body side region 93f extend in the vertical direction.

Moreover, according to the first embodiment, since the intermediate region 93e extends in the vehicle-width direction, the in-wheel motor drive device side region 93d on the one side and the vehicle body side region 93f on the other side can be disposed away from each other in the vehicle width direction.

Moreover, according to the first embodiment, the one ends of the power lines 93 extending from the power line connecting portions 91 are passed to the sleeves 92. The sleeves 92 are inserted and fixed to the through-hole of the power line connecting portions 91 together with the one ends of the power lines 93, holds the one end of the power lines 93, and further seals the ring-shaped gap between the power lines 93 and the through-hole. Therefore, it is possible to ensure the water tightness inside the power line terminal box 25b. Furthermore, the sleeves 92 are disposed so that at least one part thereof overlaps when viewed in the steering axis K direction; this thus allows for disposing the one ends of all the power lines 93 at substantially same distances from the steering axis K. Therefore, the stress will not concentrate on certain power lines 93 at the time of steering, thus making it possible to extend the life of the power lines 93.

Moreover, according to the first embodiment, the strut 76 includes the coil spring 78 and the pair of spring sheets 79b, 79c, and is stretchable in the steering axis K direction. Moreover, the one end of the power line 93 connected to the power line connecting portion 91 is disposed overlapping with the lower spring sheet 79c below, when viewed in the steering axis K direction. More specifically, the one end 93a of the power line is within a projected region 79d of the lower spring sheet 79c extending parallel to the steering axis K, as shown in FIG. 8. This makes the one end of the power lines 93 connected to the power line connecting portion 91 overlap with the lower spring sheet 79c, when viewed in the steering axis K direction. The one end 93a of the power line 93 is then disposed close to the steering axis K, and the in-wheel motor drive device side region 93d is also disposed close to the steering axis K, thus allowing for reducing the twisted degree of the in-wheel motor drive device side region 93d when the in-wheel motor drive device 10 is steered. The closer the in-wheel motor drive device side region 93d is to the steering axis K, the twisted degree of the in-wheel motor drive device 10 is can then be reduced.

Figure 12:
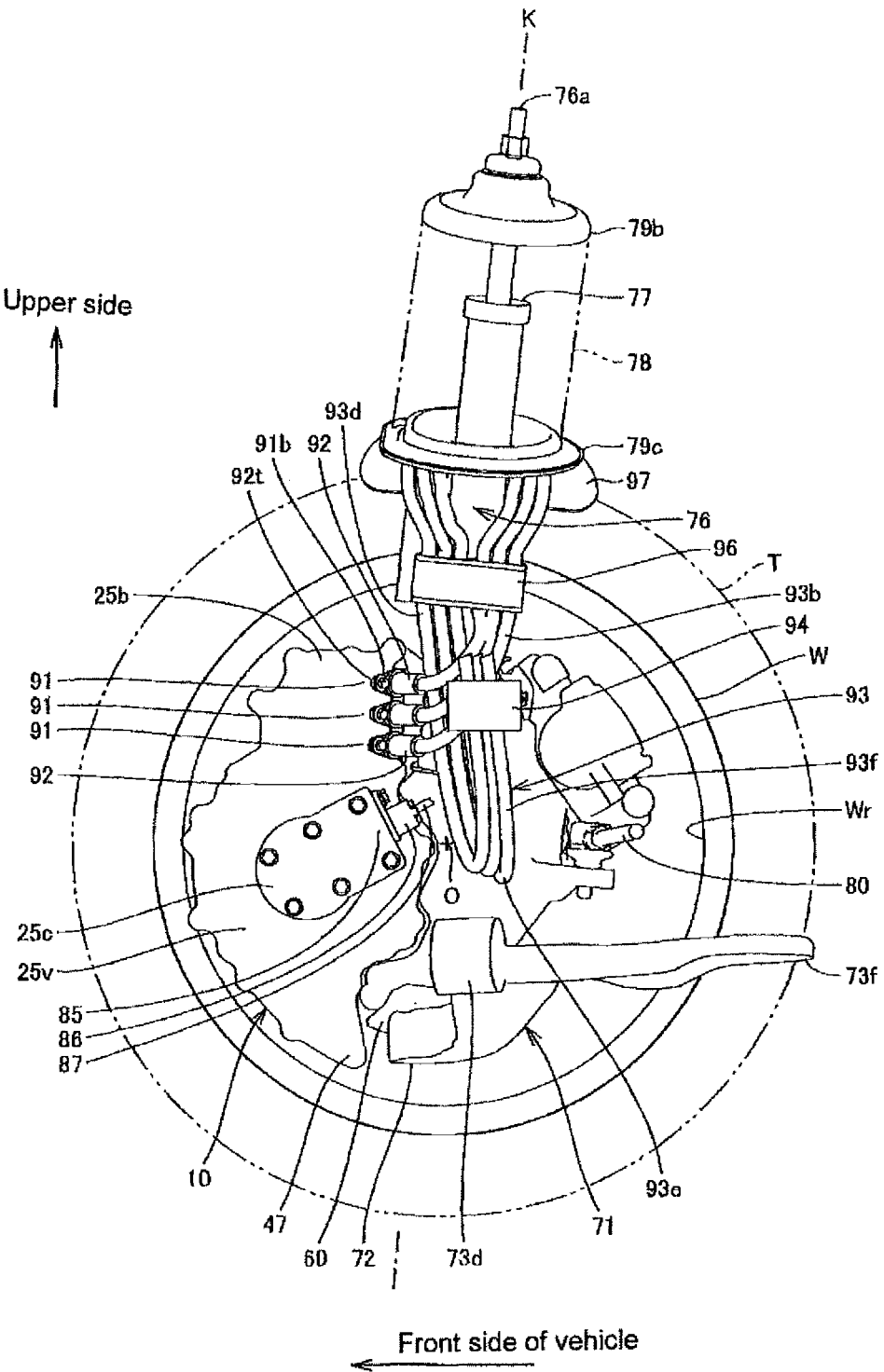
FIG. 12 is a schematic view showing a wiring arrangement of in-wheel motor power lines serving as a second embodiment of the present invention, and shows a state viewed from an inner side in the vehicle width direction.
Figure 13:
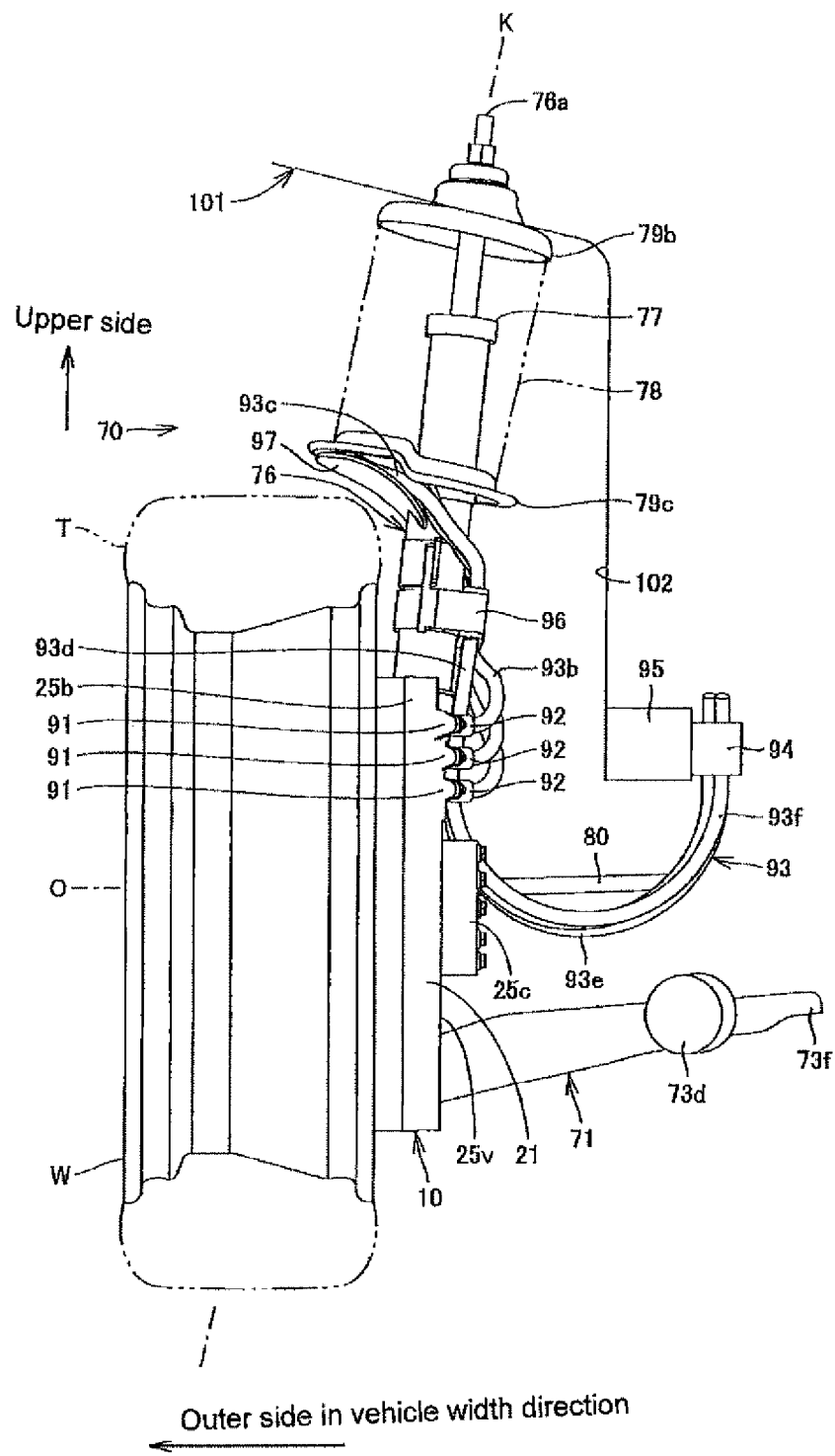
FIG. 13 is a schematic view showing the second embodiment, and shows a state viewed from the front side of the vehicle.
Figure 14:
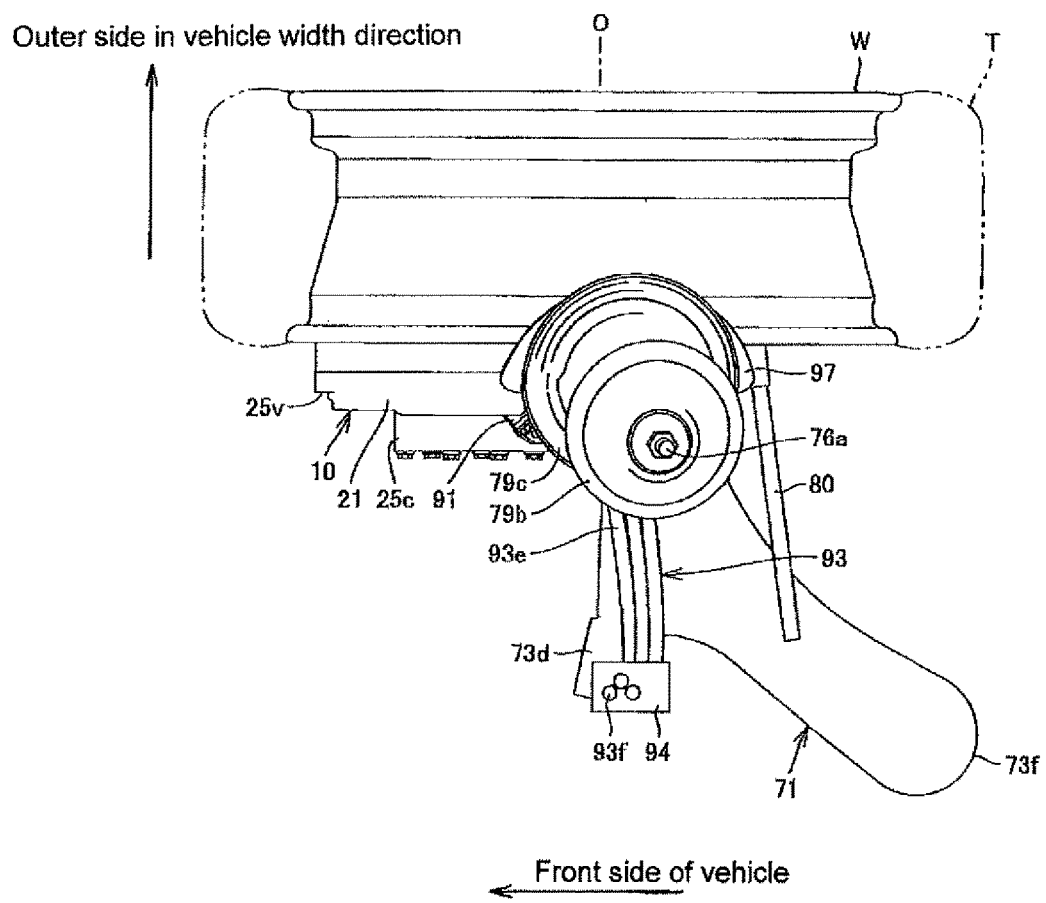
FIG. 14 is a schematic view showing the second embodiment, and shows a state viewed from above the vehicle.

Next describes a second embodiment of the present invention. FIG. 12 is a schematic view showing a wiring arrangement of an in-wheel motor power line serving as the second embodiment of the present invention, and represents a state viewed from an inner side in the vehicle width direction. FIG. 13 is a schematic view showing the second embodiment, and represents a state viewed from the front side of the vehicle. FIG. 14 is a schematic view showing the second embodiment, and represents a state viewed from above the vehicle. As for the second embodiment, configurations in common with the aforementioned embodiment are designated with identical reference signs and their descriptions have been omitted, and different configurations will be described below. In the first embodiment, the power lines 93 connect with the power line connecting portions 91 on one end thereof, and configures the in-wheel motor drive device side region 93d extending downwards from the that one end. On the contrary, the second embodiment has the power lines 93 extend upwards from the power line connecting portions 91 and are wired to bend back in the opposite direction at the lower spring sheet 79 and extend downwards, as shown in FIGS. 12 and 13.

The power lines 93 further include a wheel neighboring region 93d between one end on the power line connecting portion 91 side of the power lines 93 and the in-wheel motor drive device side region 93d. The wheel neighboring region 93b extends in the vertical direction and is wired near an upper part of the tire T, connects with the power line connecting portion 91 on its lower side, and connects with the in-wheel motor drive device side region 93d on its upper side.

The connecting position 93c of the wheel neighboring region 93b and the in-wheel motor drive device side region 93d is routed around the strut 76, and becomes adjacent to the lower spring sheet 79c. Therefore, the connecting position 93c can be bent without difficulty in a greater curvature than a radius of the strut 76.

A clearance between the power lines 93 and the wheel becomes the shortest at the connecting position 93c. Therefore, a cover 97 is provided between a tread of the tire T and the connecting position 93c. The cover 97 is attached and fixed to the outer peripheral surface of the strut 76, and supports the connecting position 93*c* from below.

The wheel neighboring region 93*b* and the in-wheel motor drive device side region 93*d* extend along the strut 76, and is held by a clamp member 96 attached and fixed to the outer peripheral surface of the strut 76. Therefore, the vehicle neighboring region 93*b* and the in-wheel motor drive device side region 93*d* will not bend away from the strut 76 at least from the clamp member 96 to the connecting position 93*c*. The clamp member 96 bundles the plurality of power lines 93 and wires them to an inner side surface in the vehicle width direction of the strut 76, and is not one which restricts the twisting of the power lines 93. Therefore, in the second embodiment also, the in-wheel motor drive device side region 93*d* of the power lines 93 can twist individually. The in-wheel motor drive device side region 93*d* is wired on the outer side in the vehicle width direction than the wheel neighboring region 93*b* on a lower side of the clamp member 96, and extends downwards beyond the wheel neighboring region 93*b*.

According to the second embodiment, the power lines 93 further include a wheel neighboring region 93*b* between the one end of the power line 93 that connects to the power line connecting portion 91 and the in-wheel motor drive device side region 93*d*. The wheel neighboring region 93*b* extends in a vertical direction, connects with the power line connecting unit 91 on its lower side, and connects with the in-wheel motor drive device side region 93*d* on its upper side. Accordingly, the in-wheel motor drive device side region 93*d* can be made longer than the first embodiment, the twisted degree per unit length of the in-wheel motor drive device side region 93*d* at the time when the in-wheel motor drive device 10 is steered can be relieved.

Moreover, according to the second embodiment, since the wheel neighboring region 93*b* is held by the clamp member 96 provided on the suspension device 70, it is possible to hold the wheel neighboring region 93*b* so that it can extend in the vertical direction.

The above describes the embodiments of this invention with reference to the drawings, however this invention is not limited to those illustrated embodiments. Various corrections and modifications may be made to the illustrated embodiments within the same scope or within an equivalent scope, of this invention.

INDUSTRIAL APPLICABILITY

The wiring arrangement of the in-wheel motor power lines serving as this invention is advantageously used in electric automobiles and hybrid vehicles.

REFERENCE SIGNS LIST

10 In-wheel motor drive device
11 Wheel hub bearing unit
12 Outer ring
15 Stationary shaft
18 Carrier
21 Motor unit
22 Motor rotating shaft
23 Rotor
24 Stator
25 Motor casing
25*b* Power line terminal box
25*c* Signal line terminal box
25*v* Motor casing cover
31 Reducer unit
43 Body casing
43*b* Back part
43*c* Directly below portion
43*f* Front part
47 Oil tank
60 Ball joint
70 Suspension device
71 Lower arm
72 Vehicle width direction outer end
73, 73*d*, 73*f* Vehicle width direction inner end
77 Shock absorber
78 Coil spring
79*b*, 79*c* Spring sheet
80 Tie rod
91 Power line connecting portion
91*b* Bolt
93 Power line
93*b* Wheel neighboring region
93*c* Connecting position
93*d* In-wheel motor drive device side region
93*e* Intermediate region
93*f* Vehicle body side region
94, 96 Clamp member
95 Bracket
K Steering axis

The invention claimed is:

1. An in-wheel motor drive device comprising:
a wheel hub coupled to a wheel;
a motor unit having a motor rotating shaft adapted to drive the wheel hub, a casing serving as a contour, and a plurality of power line connecting portions provided on the casing; and
a plurality of bendable power lines whose one ends connect to the power line connecting portion and whose other ends extend to a vehicle body outside the casing, to supply electric power from the vehicle body to the motor unit,
wherein the in-wheel motor drive device
is connected to a lower end of a strut extending in a vertical direction,
is steerable about a steering axis extending along the strut, and
wherein the plurality of power line connecting portions is disposed overlapping a spring sheet of a shock absorber provided in the strut when viewed in a steering axial direction.

2. The in-wheel motor drive device according to claim 1, wherein at least two power line connecting portions are disposed overlapping each other when viewed from the steering axial direction.

3. The in-wheel motor drive device according to claim 1, wherein
the spring sheet includes an upper spring sheet and a lower spring sheet that are disposed with a space provided therebetween vertically, and
the plurality of power line connecting portions are disposed overlapping the lower spring sheet when viewed in the steering axial direction.

4. The in-wheel motor drive device according to claim 1, wherein
the plurality of power line connecting portions is disposed shifted in a vehicle front-rear direction from the steering axis, and
one end of the power line extending from the power line connecting portion extends in a direction approaching the steering axis.

5. The in-wheel motor drive device according to claim 1, wherein the power line connecting portion is configured of a through-hole formed in the casing, and a sleeve surrounding an outer periphery of an end of the power line and adapted to be inserted into and fixed to the through-hole.

\* \* \* \* \*